United States Patent
Dehlke

(10) Patent No.: US 9,527,172 B2
(45) Date of Patent: Dec. 27, 2016

(54) METHOD AND PRESSING DEVICE FOR FORMING A PRESS CONNECTION BETWEEN A FITTING ELEMENT AND A PRE-PUNCHED COMPONENT

(71) Applicant: RICHARD BERGNER VERBINDUNGSTECHNIK GMBH & CO KG, Schwabach (DE)

(72) Inventor: Klaus Dehlke, Windsbach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 140 days.

(21) Appl. No.: 14/264,439

(22) Filed: Apr. 29, 2014

(65) Prior Publication Data

US 2014/0345113 A1   Nov. 27, 2014

(30) Foreign Application Priority Data

Apr. 29, 2013   (DE) .................. 10 2013 007 317

(51) Int. Cl.

| B23P 19/02 | (2006.01) |
|---|---|
| B23P 19/06 | (2006.01) |
| B23P 19/04 | (2006.01) |
| B21K 25/00 | (2006.01) |

(52) U.S. Cl.
CPC ............ *B23P 19/04* (2013.01); *B21K 25/00* (2013.01); *B23P 19/062* (2013.01); *Y10T 29/49945* (2015.01); *Y10T 29/49954* (2015.01); *Y10T 29/5377* (2015.01); *Y10T 29/53709* (2015.01); *Y10T 29/53996* (2015.01)

(58) Field of Classification Search
CPC ....... B23P 19/06; B23P 19/062; B23P 19/063; B23P 19/064; F16B 37/048; F16B 37/062; F16B 37/065; F16B 37/068; Y10T 29/53709; Y10T 29/53726; Y10T 29/5377; Y10T 29/49915; Y10T 29/4992; Y10T 29/49934; Y10T 29/49954; Y10T 29/49956; Y10T 29/49963; Y10T 29/4994; Y10T 29/53996
See application file for complete search history.

(56) References Cited

U.S. PATENT DOCUMENTS 2,325,929 A * 8/1943 Macormack ........... B21D 51/40
                                                       29/243.517
2,521,505 A * 9/1950 Doyle ..................... B21J 15/04
                                                          269/310

(Continued)

FOREIGN PATENT DOCUMENTS

DE           2656232 A1    6/1977

*Primary Examiner* — Essama Omgba
(74) *Attorney, Agent, or Firm* — Laurence A. Greenberg; Werner H. Stemer; Ralph E. Locher

(57) ABSTRACT

In order to reliably ensure a press-in connection between joining elements, in particular a press-in nut and a pre-punched component, a press-in device contains a die which has a die ring and a die mandrel. The die mandrel is mounted counter to a spring force in the manner of a pilot pin. In addition, the die ring is also mounted counter to a spring force such that a two-stage press-in operation is carried out. Preferably, during a first press-in stage an anti-rotation lock is formed between the press-in nut and the component and in a second press-in stage an axial pull-out prevention measure is formed. To this end, the die mandrel deforms a nut flange.

7 Claims, 3 Drawing Sheets

(56) References Cited

U.S. PATENT DOCUMENTS

| | | | | |
|---|---|---|---|---|
| 3,938,239 A | * | 2/1976 | Lauth | B23P 19/062 29/243.519 |
| 4,018,257 A | * | 4/1977 | Jack | B23P 19/062 29/432 |
| 5,012,573 A | * | 5/1991 | Ito | A41H 37/00 29/432 |
| 5,560,099 A | * | 10/1996 | Leistner | B23P 19/062 29/432.2 |
| 6,012,215 A | * | 1/2000 | DeMoura | B23P 19/062 29/243.5 |
| 6,199,271 B1 | * | 3/2001 | Hahn | B21D 39/031 29/254 |

* cited by examiner

METHOD AND PRESSING DEVICE FOR FORMING A PRESS CONNECTION BETWEEN A FITTING ELEMENT AND A PRE-PUNCHED COMPONENT

BACKGROUND OF THE INVENTION

Field of the Invention

The invention relates to a method and a press-in device for forming a press-in connection between a joining element, in particular between a press-in nut and a prepunched component.

A method of this kind and a device of this kind can be gathered from DE 2 656 232 A1. Said document discloses a method for forming a connection between a press-in nut and a prepunched metal sheet. The press-in nut is in this case pressed in with the aid of a press-in device. The latter comprises a press-in punch and a die having a die punch which is mounted within a die ring so as to be displaceable in an axial direction counter to the spring force of a spring element. The die punch has on its front side a pilot pin which projects beyond the die ring. The die is introduced with the pilot pin at the front into the prepunched component. The press-in nut is subsequently placed onto the pilot pin such that the latter passes through the threaded hole in the press-in nut. With the aid of the press-in punch, the press-in nut is subsequently pressed against the die punch. In this case, a collar of the press-in nut, also known as a nut flange, reaches, in the rear region following the pilot pin, a reshaping region of the punch, such that the nut flange is reshaped so as to form an axial locking means. At the same time, the metal sheet is also reshaped.

The pressing in of joining elements is generally common knowledge and is employed in particular in the automotive industry for producing fastening options on components, in particular on metal sheets. Joining elements are in the present case generally understood as being those functional elements which are designed to join two parts. Such joining elements are in particular press-in bolts such as press-in screws and preferably the abovementioned press-in nuts. In press-in nuts, the nut flange is usually radially expanded or flanged and connected to the component such that effective fastening and pull-out prevention in the axial direction is achieved. This can take place for example by the nut flange cutting into a wall region of the hole in the component or by engaging behind a hole rim. In general, in order to fasten such press-in elements, deformation of a deformation region of the press-in element and/or of the component is necessary.

BRIEF SUMMARY OF THE INVENTION

Against this background, the invention is based on the object of specifying an improved press-in method and an improved press-in device for joining elements, in particular for press-in nuts.

In order to form a press-in connection between a joining element, in particular between a press-in nut and a pre-punched component, provision is in principle made for the joining element to be pressed in an axial direction against a die. In this case, a deformation region of the joining element is deformed by a die. In the case of a press-in nut, in particular a collar known as a nut flange is reshaped. The die has a die ring and a die mandrel that is guided relative to the die ring and within the die ring, said die mandrel being used to center and deform the joining element. At the same time, said die mandrel is in the form of a pilot pin and is mounted so as to be displaceable in the axial direction counter to a spring force. On account of being in the form of a pilot pin, the die mandrel projects in the axial direction with respect to the die ring in a starting situation. In the method, the die mandrel is initially guided through the particular hole in the prepunched component. In this case, not only is the die centered precisely relative to the component but at the same time the joining element is also centered relative to the component. The die mandrel in this case usually centers the joining element in that the latter is placed onto the die mandrel.

According to the invention, provision is now made for the press-in operation to be in two stages with two press-in stages and, in addition to the die mandrel, also for the die ring to be additionally displaced in the axial direction counter to a spring force during the press-in operation.

This configuration is based on the consideration that for many joining elements a two-stage press-in operation takes place in order to form different press-in functional regions between the joining element and the component. Frequently, in addition to an axial pull-out prevention means, an anti-rotation lock is also formed. To this end, one or more antirotation lock elements are usually formed on the joining element, said antirotation lock elements likewise being pressed into the component. On account of the configuration with the additional mounting of the die ring counter to a spring force, a reliable two-stage press-in operation is ensured and at the same time it is possible for the die mandrel to act both as a pilot pin and as a reshaping element for reshaping the joining element.

Expediently, provision is made here for the spring forces that act on the die mandrel and on the die ring to be different, such that the two press-in stages are carried out successively one after the other in the multistage press-in operation. Preferably, the die mandrel is mounted counter to a smaller spring force than the die ring in this case.

Preferably, the spring force that acts on one of these parts, namely the die ring or the die mandrel, is sufficiently large for said part to be kept in a front position during a first press-in stage. Preferably, the spring force that acts on the die ring is sufficiently large. During the first press-in stage, the die ring is thus not supported against a fixed stop but merely against the spring force. As a result, reliable decoupling of the two press-in stages is again achieved. Expediently, this is because different press-in forces are exerted during the two press-in stages, wherein only one of the two parts is guided into an axially retracted position counter to the spring forces thereof during the first press-in stage and both parts are guided into an axially retracted position counter to the spring forces thereof in the second press-in stage.

Therefore, in the first press-in stage preferably the anti-rotation lock is formed where slight press-in forces are still applied. By contrast, in the second press-in stage, deformation of the joining element, in particular of the nut flange, takes place, where much higher press-in forces occur. The antirotation lock elements are formed for example circumferentially on the joining element and cut for example into a hole rim. In a preferred configuration, the press-in elements are formed on an underside of a head region of the joining element, by way of which the joining element is pressed onto a hole rim. The nut collar also usually projects from this underside of the head region. Said nut collar is thus surrounded by a collar-like head region which has on its underside the press-in elements for example in the manner of ribs that extend radially outward. These ribs are pressed into the component surface. In the process, they are not usually deformed but rather only the component, which is usually metal sheet, in particular sheet steel. As soon as the antirotation lock elements have been pressed in and a press-in punch of the press-in device moves the joining element further in the axial direction, the joining element—because its head region rests in the meantime against the component—is moved in the axial direction with the entire component, such that the press-in forces that are exerted on the die increase considerably. As a result, the die ring is moved in the axial direction counter to the spring force until it reaches a retracted position. This is preferably defined by a fixed stop. During the further movement of the press-in punch the press-in force that is required for the second press-in stage is then applied and brings about the deformation of the deformation region (nut flange).

By contrast, the die mandrel is moved back axially into an axially retracted position before the first press-in stage. Therefore, an only comparatively small spring force is exerted on the die mandrel, said spring force being sufficient for the homing function. The die mandrel is moved into the rear position, which is expediently defined by a fixed stop, before the press-in operation in the first press-in stage.

In a particularly expedient configuration, the die is controlled in a purely passive manner in the two-stage press-in operation. Therefore no active control elements, for example a hydraulic or pneumatic or electric control of the different axial movements of the die mandrel and of the die ring are required and formed. Rather, in a preferred configuration, provision is made for the two parts consisting of the die mandrel and the die ring to each be mounted with the aid of a spring element. The spring elements expediently have in this case different stiffnesses to apply spring forces of different sizes. As a result, the desired two-stage process is achieved solely through the choice of the different spring stiffnesses. The press-in punch can therefore be moved easily in the axial direction up to a predetermined press-in force. Therefore, a special control for differentiating between the two press-in stages does not need to be formed on the drive side of the press-in punch, by way of which the joining element is moved with respect to the die. Therefore, it is preferably not provided, either.

Expediently, in this case the two spring elements are mounted with respect to a common die base. The two spring elements are thus supported on a common component. Expediently, this component at the same time also defines a fixed stop for the rear position of these two parts. The latter are therefore supported mechanically in the manner of a fixed stop in their rear retracted position.

In this case, the die ring is expediently mounted on the die base by means of an annular spring and furthermore the die mandrel, or at least the spring element assigned thereto, is guided through a central opening in the annular spring. The die mandrel is therefore arranged generally concentrically with the annular spring, which enables a space-saving design. Annular springs are understood in the present case to be those spring elements which have a central opening. Preferably, the annular spring is formed in this case as a disk spring or as a disk spring assembly. Alternatively, it may in principle also be in the form of a helical spring. A disk spring has the particular advantage of an only small axial overall height and allows very high spring forces.

According to an independently inventive configuration, the die mandrel has a conical mandrel tip which is configured to reshape the deformation region of the joining element, in particular of the nut flange. The mandrel tip therefore widens noticeably in the axial direction, specifically up to a diameter which is larger than the inside diameter of the counterpart, to be deformed, of the joining element. This region of the conical mandrel tip therefore exerts the force for reshaping the deformation region of the joining element. This means that the die mandrel engages, in its function as a pilot pin, only a little into the central opening surrounding the nut flange and does not pass right through the threaded hole in the press-in nut. As a result, the risk of damage to the thread is reliably avoided.

Preferably, in its role as a pilot pin and for the purpose of centering the joining element, the die mandrel is thus supported on the joining element only by way of its conical mandrel tip. As a result, a very good centering effect is also achieved, since manufacturing tolerances can be compensated without problems via the conical mandrel tip.

The object is furthermore achieved according to the invention by a press-in device having the features of the main claims. The advantages and preferred configurations that are cited with regard to the method also apply in a corresponding manner to the press-in device. Preferred developments of the press-in device can be gathered accordingly from the dependent claims and from the above explanations.

BRIEF DESCRIPTION OF THE SEVERAL VIEWS OF THE DRAWING

An exemplary embodiment of the invention is explained in more detail in the following text with reference to the figures. In said figures, in each case in schematic illustrations.

DESCRIPTION OF THE INVENTION

Figure 1:
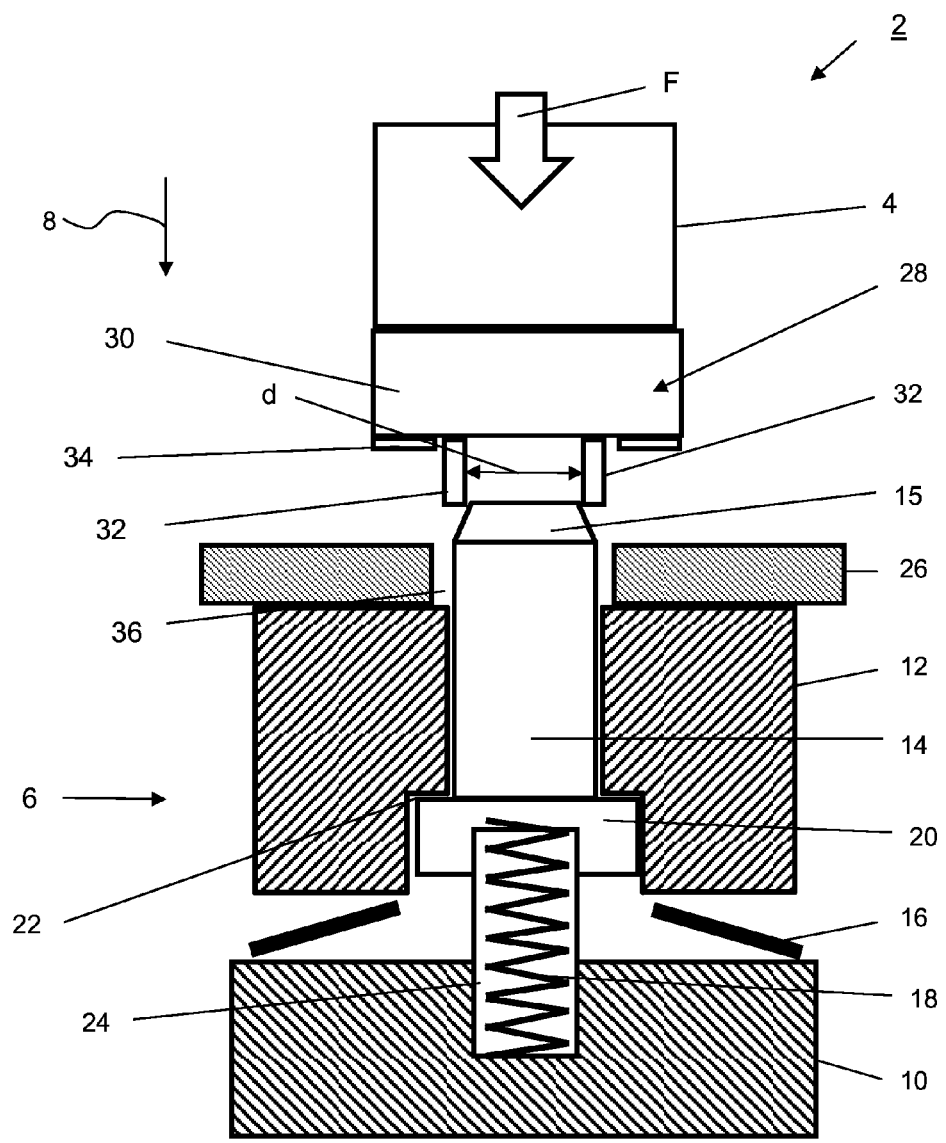
FIG. 1 shows a schematic side view in partial section of a press-in device prior to the press-in operation.

In the individual figures, parts having the same effect are provided with the same reference signs.

The press-in device 2 illustrated in the figures comprises a press-in punch 4 and a die 6. The press-in punch 4 is in this case movable in an axial direction 8 with respect to the die 6. Via the press-in punch 4, an axial force F is applied. The press-in punch 4 is in this case driven with the aid of a drive unit (not illustrated in more detail here), via which the necessary press-in force F is applied. This drive unit may be for example a force-controlled or path-controlled drive unit. The latter may be driven either electrically, pneumatically or hydraulically.

The die 6 itself comprises a die base 10, a die ring 12 and a die mandrel 14. The die ring 12 is supported with respect to the die base 10 with the aid of a first spring element, which is in the form of a disk spring 16 in the exemplary embodiment. The die mandrel 14 is supported with respect to the die base 10 with the aid of a second spring element, which is in the form of a (helical) compression spring 18 in the exemplary embodiment.

The die mandrel 14 is guided centrally within the die ring 12. In the exemplary embodiment, the die mandrel has a widened foot 20, by way of which it rests, in a front position illustrated in FIG. 1, against a stop 22 formed on the die ring 12. In the exemplary embodiment, the foot 20 has a central receptacle, into which one end of the compression spring 18 is introduced. At the opposite end, the compression spring is supported in a second receptacle, formed in the manner of a bore 24, within the die base 10. The disk spring 16 concentrically surrounds the compression spring 18. The disk spring 16 rests on the die base 10 and can be held in a manner which is not illustrated in more detail for example by a depression or groove.

Furthermore, a section of a prepunched component 26 and also a joining element in the form of a press-in nut 28 are illustrated in FIG. 1. The press-in nut 28 comprises a nut head 30, from the underside of which a nut flange 32 that extends in the axial direction 8 protrudes. Furthermore, ribs 34 that extend in the radial direction are arranged on the underside of the nut head 30, said ribs serving to form an antirotation lock. The nut flange 32 is generally a deforming part which is reshaped to form an axial locking means of the joining element in the component 26 during the press-in operation that will be described in the following text.

The die mandrel 14 furthermore has at its front end a conically narrowing mandrel tip 15. The latter has at its front end a diameter which is smaller than an inside diameter d of the nut flange 32. At the same time, the conical mandrel tip 15 widens to a final diameter which is larger than the inside diameter d of the nut flange 32. This conically expanding mandrel tip 15 is adjoined by a cylindrical shank region of the die mandrel 14. As a result of this special configuration of the mandrel tip 15, the die mandrel 14 engages into the nut flange 32 only with its mandrel tip 15 during the press-in operation, without the inner surfaces within the nut flange 32 or within the nut head 30 being damaged. An internal thread is usually formed on the inner side of the nut head 30.

The prepunched component 26 has a hole 36 into which the press-in nut 28 is inserted with the nut flange 32.

For a reliable fit of the press-in nut 28, centering which is as exact as possible in relation to the hole 36 is required. The component 26 usually has a plurality of holes 36. With regard to cycle times that are as short as possible for the introduction of the joining elements into the holes 36, rapid precise orientation in each case of the component 26 in relation to the press-in device 2 is required. In order for this to be ensured reliably, the die mandrel 14 is formed generally in the manner of a pilot pin. To this end, it is mounted in a resilient manner and projects beyond the die ring in its front position illustrated in FIG. 1. On account of the resilient mounting, hole finding can take place and as soon as the hole 36 and the die mandrel 14 have been aligned with one another, the die mandrel 14 is pushed through the hole 36 by way of the spring force of the compression spring 18. Subsequently, the actual press-in operation starts as follows:

In a centering stage, first of all the press-in nut 28 is placed with the nut flange 32 onto the conical mandrel tip 15. In the process, the mandrel tip 15 passes only a little into the nut flange 32. Since the nut flange 32 comes to sit on the conical mandrel tip 15, a concentric arrangement and alignment of the press-in nut 28 relative to the press-in tool 2 takes place.

Figure 2:
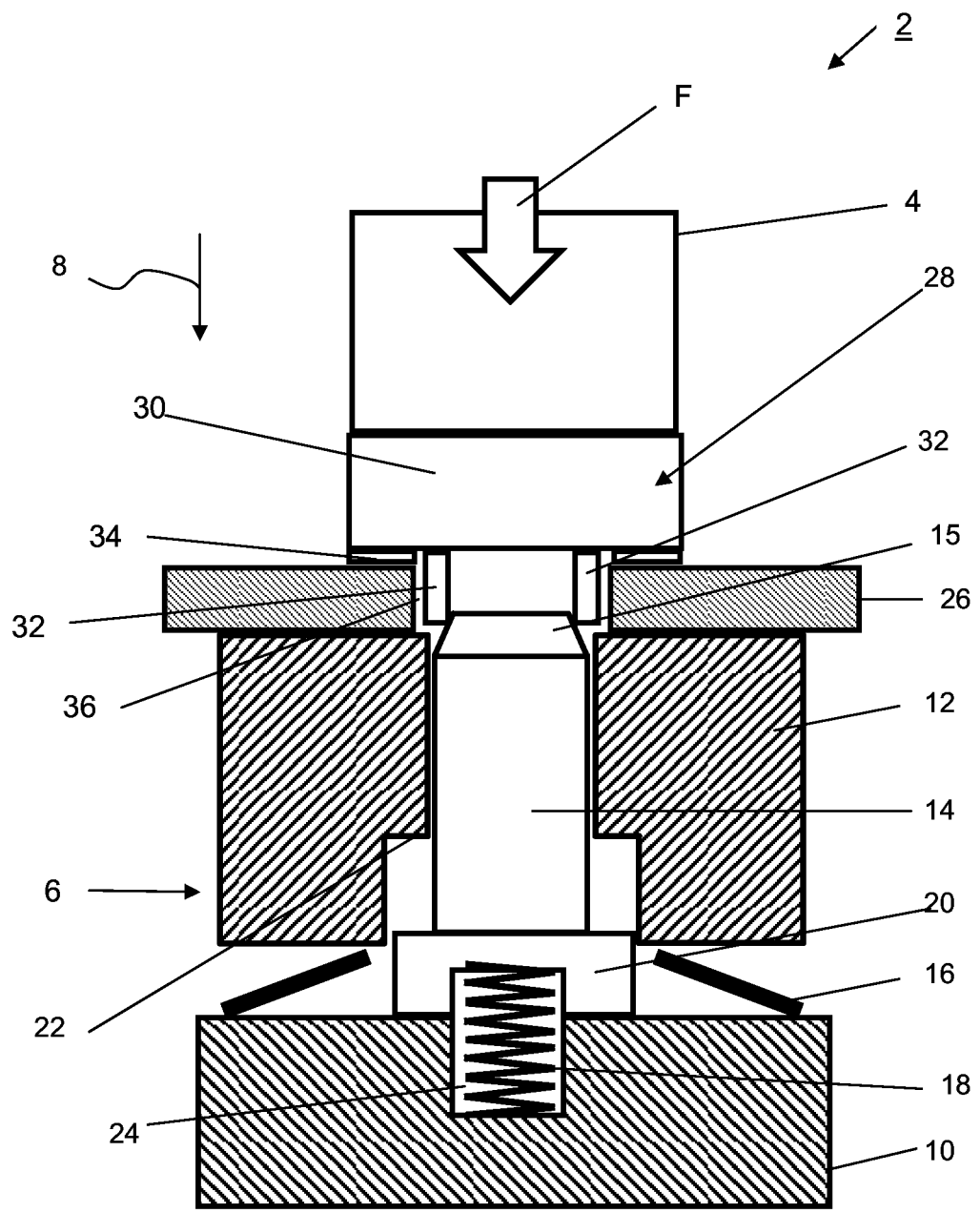
FIG. 2 shows the press-in device according to FIG. 1 at the start of the press-in operation.

Subsequently, the press-in punch 4 is moved further in the axial direction 8. In this case, the die mandrel 14 is moved from its front position, illustrated in FIG. 1, into a rear position, illustrated in FIG. 2, counter to the spring force of the compression spring 18. In this rear position, the die mandrel 14 is supported on the die base 10. At the same time, the press-in nut 28 comes to rest with the nut head 30, to be more precise with the ribs 34, on the top side of the component 26.

Subsequently, the actual press-in operation starts. In a first press-in stage, the ribs 34 are pressed into the component surface. During this first press-in stage, the die ring 12 is in its front position, illustrated in FIG. 2. The disk spring 16 therefore has sufficient spring force to withstand the press-in force required for pressing the ribs 34 into the component surface. This ensures that first of all the ribs 34 are pressed in before the actual deformation of the nut flange 32 takes place in the following second press-in stage.

Figure 3:
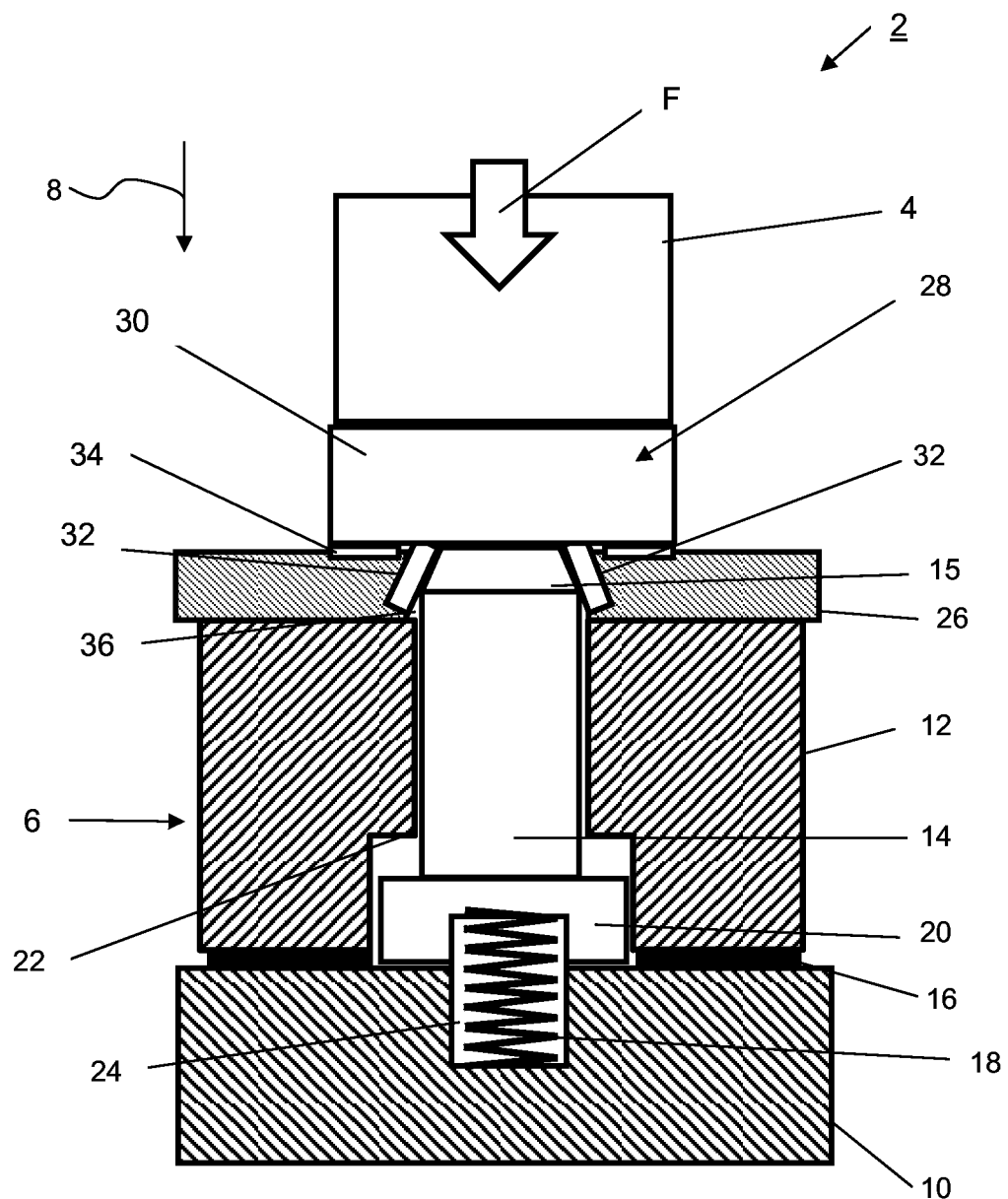
FIG. 3 shows the press-in device according to FIG. 1 after the end of the press-in operation.

This situation is illustrated in FIG. 3. After the ribs 34 have been pressed in, the press-in punch 4 travels further in the axial direction and carries along not only the press-in nut 28 but also the component 26 in the axial direction 8, such that the die ring 12 is now moved into its retracted position, as is illustrated in FIG. 3. In this retracted position, the die ring 12 is supported on the die base 10. Subsequently, the second reshaping operation starts, in which the nut flange 32 is reshaped. This takes place by radial spreading with the aid of the die mandrel 14, which is now moved further into the nut flange 32. On account of its conical mandrel tip 15, it widens said nut flange radially, such that the desired axial pull-out prevention is established between the nut flange 32 and the component 26.

Subsequently, in a form which is not illustrated in more detail here, the press-in punch 4 is moved back again counter to its advancing direction and the entire press-in device 2 is opened and moved to the next hole 36 in the component 26 in order to insert the next press-in nut 28.

REFERENCE SIGNS

2 Press-in device
4 Press-in punch
6 Die
8 Axial direction
10 Die base
12 Die ring
14 Die mandrel
15 Mandrel tip
16 Disk spring
18 Compression spring
20 Foot
22 Stop
24 Bore
26 Component
28 Press-in nut
30 Nut head
32 Nut flange
34 Ribs
36 Hole
d Inside diameter

The invention claimed is:

1. A method for forming a press-in connection between a joining element and a pre-punched component, which comprises the steps of:
pressing-in the joining element in an axial direction against a die, wherein the die deforms the joining element and the die has a die ring and a die mandrel mounted to so as to be displaceable in the axial direction counter to a spring force, the die mandrel being in the form of a pilot pin having a conical mandrel tip and being used to deform the joining element, performing the pressing-in step in two stages with two press-in stages and the die ring being displaced in the axial direction counter to the spring force during the pressing-in step, wherein the spring force acting on one of two parts consisting of the die ring and the die mandrel being sufficiently large for the one part to be kept in a front position during one of the press-in stages;
exerting different press-in forces in the two press-in stages, and in that only one of the two parts consisting of the die mandrel and the die ring is pressed into an axially retracted position counter to spring forces in a first press-in stage of the two press-in stages and both parts are pressed into the axially retracted position counter to the spring forces in a second press-in stage of the two press-in stages; and placing the joining element on to the die mandrel for centering purposes prior to an actual press-in operation, the die mandrel supporting the joining element by way of the conical mandrel tip above a level of the pre-punched component, wherein the conical mandrel tip widens up to a diameter which is larger than an inside diameter of the joining element.

2. The method according to claim 1, wherein the spring forces that act on the die mandrel and on the die ring are different.

3. The method according to claim 2, wherein the spring force that acts on the die mandrel is smaller than a spring force that acts on the die ring.

4. The method according to claim 1, which further comprises controlling the die in a purely passive manner for the two-stage pressing-in.

5. The method according to claim 1, wherein the die has a die base, the die mandrel and the die ring are each mounted in a resilient manner with respect to the die base with an aid of a spring element.

6. The method according to claim 5, which further comprises mounting the die ring on the die base by means of an annular spring and the die mandrel is guided through a central opening in the annular spring.

7. A method for forming a press-in connection between a joining element and a pre-punched component, which comprises the steps of:

pressing-in the joining element in an axial direction against a die, wherein the die deforms the joining element and the die has a die ring and a die mandrel mounted to so as to be displaceable in the axial direction counter to a spring force, the die mandrel being in the form of a pilot pin having a conical mandrel tip and being used to deform the joining element, performing the pressing-in step in two stages with two press-in stages and the die ring being displaced in the axial direction counter to the spring force during the pressing-in step;

placing the joining element on to the die mandrel for centering purposes prior to an actual press-in operation, the die mandrel supporting the joining element by way of the conical mandrel tip above a level of the pre-punched component, wherein the conical mandrel tip widens up to a diameter which is larger than an inside diameter of the joining element;

forming the joining element in a form of a press-in nut having at least one anti-rotation lock element and a nut flange;

in a starting state, the die mandrel takes up an extended position in which the die mandrel projects beyond the die ring and engages in a hole in the pre-punched component;

subsequently placing the press-in nut with the nut flange onto the conical tip of the die mandrel;

subsequently pressing the press-in nut against the die, by the following steps of:

first, moving the die mandrel back in the axial direction into a rear position counter to the spring force of a first spring, wherein in the rear position the die mandrel is supported on a die base;

subsequently pressing the anti-rotation lock element into the pre-punched component;

then moving the die ring back in the axial direction into a retracted position counter to the spring force of a second spring, wherein in the retracted position the die ring is support on the die base; and finally pressing the nut flange against the die mandrel such that the nut flange is deformed to form an axial pull-out prevention device.

* * * * *